United States Patent [19]

Hahn, Jr.

[11] 3,766,640

[45] Oct. 23, 1973

[54] METHOD OF MANUFACTURING MAGNETIC TRANSDUCERS

[75] Inventor: Frederick W. Hahn, Jr., Boulder, Colo.

[73] Assignee: International Business Machines Corporation, Armonk, N.Y.

[22] Filed: Dec. 20, 1971

[21] Appl. No.: 209,877

[52] U.S. Cl. .............................. 29/603, 179/100.2 C
[51] Int. Cl. .............................. G11b 5/42, H01f 7/06
[58] Field of Search ................ 29/603; 179/100.2 C; 340/174.1 F; 346/74 MC

[56] References Cited

UNITED STATES PATENTS

| | | | |
|---|---|---|---|
| 3,344,237 | 9/1967 | Gregg | 179/100.2 |
| 3,613,228 | 10/1971 | Cook et al. | 29/603 |
| 2,941,045 | 6/1960 | Connell | 179/100.2 C |

*Primary Examiner*—Charles W. Lanham
*Assistant Examiner*—Carl E. Hall
*Attorney*—Donald W. Margolis et al.

[57] ABSTRACT

Magnetic transducing heads capable of reading and writing magnetic information in the form of a pattern of magnetization on a magnetic recording medium are provided utilizing a combination of magnetic sheet metal foil and thin film deposition techniques. The transducing heads consist of thin metallic magnetic foil forming a core and enclosing a deposited conductive exciting winding separated from the magnetic foil by deposited nonconductive material. The exciting winding is displaced from the transducing gap, the width of the gap being controlled by other deposited material.

The transducer is provided by depositing a layer of insulation upon a portion of a prepared metallic magnetic foil, depositing the required exciting winding, and then further insulating the conductive winding prior to completing the magnetic core with foil.

12 Claims, 8 Drawing Figures

METHOD OF MANUFACTURING MAGNETIC TRANSDUCERS

BACKGROUND OF THE INVENTION

1. Field of the Invention

This invention relates to methods of manufacturing an electromagnetic transducers and to the resulting magnetic heads which are useful for providing electrical to magnetic transducing action to write and read information in relation to a magnetic medium in response to or for producing electrical signals. The method of manufacture includes deposition techniques such as sputtering, vacuum deposition, electroless plating, electroplating, and other techniques for producing continuous films of conductive and non-conductive material as well as techniques of photoetching and sheet metal foil manipulation.

2. Description of the Prior Art

Magnetic transducing heads haVe been in use since the inception of magnetic recording technology. Basically, every magnetic transducer is in the form of a magnetically permeable core member including at least one finite nonpermeable discontinuity forming a gap and at least one electrically conductive exciting winding associated with the core. A changing magnetic field in close proximity to the gap, such as that caused by movement of a previously recorded magnetic record medium, causes an electric signal to be generated in the associated conductor which signal is sensed by associated devices as a bit of information. Conversely, an electric current generated through the conductive winding causes a magnetic field to be generated within the core, which signal can be externally detected at the gap as a magnetic field. A mgnetic record medium in close proximity to the gap at the time a magnetic signal is generated will retain the informatIon imparted by this field in the form of a magnetic signal.

Traditionally, magnetic transducers have been formed of gross pieces of metallic or ceramic magnetically permeable material manually assembled and wound with conductive wire. More recently, miniaturized recording heads fabricated by techniques similar to those used in integrated-circuit technology, namely evaporation, sputtering, plating and photoetching have been proposed.

In most instances, batch-fabricated or thin film heads have been prepared entirely by a series of deposition steps including the subtraction of some portions after they have been deposited. Typically, a substrate is required for such a process. Material, such as rigid, nonconductive, hard ceramic, is often selected as a substrate, although conductive substrates may be used. Where a conductive substrate is used, an additional step of placing an insulating coating upon the substrate is required. Then, for example, a film of magnetic material is deposited upon the substrate. The magnetic material may be deposited through a mask into a desired shape, or, as is generally the case, it is deposited as a film and converted to a desired shape through multistep photoetching techniques. Next, a conductor is deposited in juxtaposition to the magnetic film, and again modified with multistep photoetching techniques to obtain the desired single turn or multiturn shape. Typically, the conductor is in the form of a stripe directly over a portion of the magnetic film with the ends of the conductor available for connection with external electrical read or write circuitry. Where the magnetic film is conductive, a layer of insulation is deposited intermediate the film and conductor to prevent short-circuiting of the current. Material to provide a gap in the head is required at the pole tip of the magnetic film and may be provided by the conductor or insulator or by material deposited specifically for the purpose of forming a gap. In some instances, a gap is provided in the magnetic core by the physical removal of magnetic material from the desired gap area. Finally, an additional layer of magnetic film is provided by multistep deposition and photoetching techniques a conjunction with the first magnetic film to complete the core. As outlined, every portion of the prior art heads are provided by deposition and photoetching of deposited film. With the exception of the substrate, no material utilized in producing the head is capable of being handled manually. Furthermore, the magnetic characteristics of deposited films are at times difficult to control or reproduce and may not be comparable in quality to the magnetic permeability and saturation characteristics of, for example, magnetic foil material.

In another form of prior art head, magnetic ceramic ferrite material has been formed into the components of a core for a multigap transducer and had conductive lines deposited to form both the gap and a series of one turn windings to complete the head. However, such ferrite material, while it can be handled manually and is capable of exhibiting good magnetic characteristics, is difficult to mold or machine to desired configurations, especially where miniaturization is desired. Furthermore, placing the conductor at the gap and the windings in series is undesirable because it causes circuitry problems which require the use of a transformer to solve.

In most prior art thin film and batch-fabricated transducers, the conductive material is also utilized as the gap material for the sake of simplicity. As the conductive material is typically soft and malleable, such as copper, silver or aluminum, it is subject to preferrential erosion during transducing activity with record media which are typically abrasive in character. Such erosion changes the electrical and physical characteristics of the head and renders it inefficient after short periods of use. Furthermore, where the conductor serves as the gap material, requirements for controlled small gap size and adequate conductance may be in conflict. Small crosssectional area of the conductor at the gap, such as is desired for high density recording, will typically result in high electrical resistance and the generation of undesired heat within the head which in turn causes changes in its electrical and magnetic characteristics.

SUMMARY OF INVENTION

In accordance with this invention, a transducer is provided which is comprised of discrete magnetic metallic foil portions, and deposited conductors which conductors are not present at the gap of the head. In one aspect of this invention, the foil material is grooved to provide a repository for the conductive material. In another aspect of this invention, the magnetic foil is substantially planar. Methods of providing these transducers in either discrete or non-serial multichannel form are also disclosed.

As used herein, "magnetic foil" is intended to mean a thin sheet of magnetically permeable metal in a discrete form. By its nature, foil provides a gross magnetic material which can be handled and which is usable, as taught herein, in the batch-fabrication of miniature heads and especially multitrack miniature heads. Since the magnetic foil material is manufactured separately from the process of making the head, its magnetic characteristics and thickness, preferably in the range of about 0.2 mil to 10 mils, can be carefully controlled through well known annealing and rolling processes. The foil is therefore capable of displaying good and predictable magnetic and physical characteristics at all times. The use of foil also decreases the number of process steps, such as the deposition of the magnetic film itself, and subsequent multistep photoetching to provide the magnetic material in a desired shape. However, if desired, the foil can be shaped by either mechanical or photoetching techniques. Furthermore, the use of magnetic foil allows the manufacturing process to be carried out without the use of a separate substrate. Separate substrates normally must be utilized in the manufacture of a head which is provided entirely by thin film deposition techniques.

The foregoing and other objects, features and advantages of the invention will be apparent from the following more particular description of preferred embodiments of the invention as illustrated in the accompanying drawings.

DESCRIPTION OF THE PREFERRED EMBODIMENTS

Figure 1:
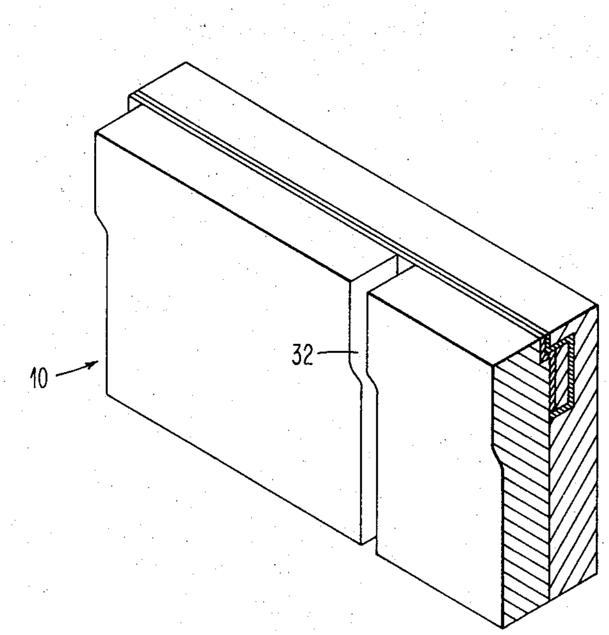
FIG. 1 is a perspective, sectional, exaggerated view of a transducer made in accordance with the present invention.

In carrying out the present invention, the actual materials utilized in forming a transducer, as well as the shape and number of head per transducer will be controlled by the ultimate use to which this structure is to be put.

The present invention utilizes ductile magnetically permeable foil materials. Included in these materials are nickel iron alloy compositions, including many compositions containing 1 percent to about 15 percent of added elements or two or more added elements such as molybdenum, chromium, manganese, copper, vanadium, titanium, silicon, aluminum and tungsten. Also, included are the iron-nickel-cobalt compositions, including compositions containing 1 percent to about 15 percent of added elements. Other suitable materials are the iron-cobalt series of materials, including those alloys having an iron content of 25 percent or higher, the balance chiefly cobalt, with or without small amounts of added elements. These materials are generally magnetically soft and permeable, ductile and conductive, not possessing high electrical resistance. It also includes most other magnetically permeable metals and alloys which can be produced in the form of a thin sheet of metal foil, but excludes materials which, while predominantly metal, are brittle and of low conductivity.

One group of especially attractive magnetic foil materials are 77–83 percent nickel, and 3–6 percent molybdenum, with the balance iron. included in this group are many commercially available foils, such as HyMu 80, HyMu 800, Supermalloy, 4–79 molybdenum permalloy, English Mumetal, Muvar, and Supermax. Oter suitable commercial alloys include Manimax (47 percent nickel, 3 percent molybdenum, balance iron), U. S. Mumetal (77 percent nickel, 5 percent copper, 2 percent chromium, balance iron), French Mumetal (78 percent nickel, 6 percent copper, 4 percent molybdenum, balance iron), permalloy (30 percent nickel as a minimum, balance iron), chrome permalloy (45 percent nickel, 6 percent chromium, balance iron) and Radiometal (45 percent nickel, 5 percent copper, balance iron). While the present invention is not limited to these materials, they are suitable for its practice.

The electrically nonconducting material utilized in the practike of this invention is preferably formed of a metallic oxide or compound, and may be provided by, for example, vacuum deposition or sputtering, or by any of the other numerous coating methods known in the prior art. Included among the suitable inorganic insulating materials are aluminum oxide and its compounds, silicon oxide and its compounds, zirconium oxide, titanium oxide, iron oxide, calcium silicate, aluminum silicate, calcium phosphate, magnesium phosphate, and magnesium oxide, as well as the oxides of lithium, beryllium, strontium, barium, boron, lead, thorium, tantalum, tin, and cerium. The nonconducting portions of the head may also be formed by conventional slurry coating techniques or by the decomposition of organic compounds such as magnesium methylate. As a further alternative, the foil or conductor may be subjected to suitable heat in the presence of oxygen, for example, in the range of about 260° C to 540°C, so that the surface of the metal is oxidized to form a thin nonconductive metal oxide shell.

The transducer of the present invention may consist of a plurality of write heads and a plurality of read heads, in combination, which operate together to write and read a plurality of related data tracks on a magnetic recording media. FIG. 1 shows in exaggerated perspective one embodiment of such a multihead transducer 10.

Figure 2:
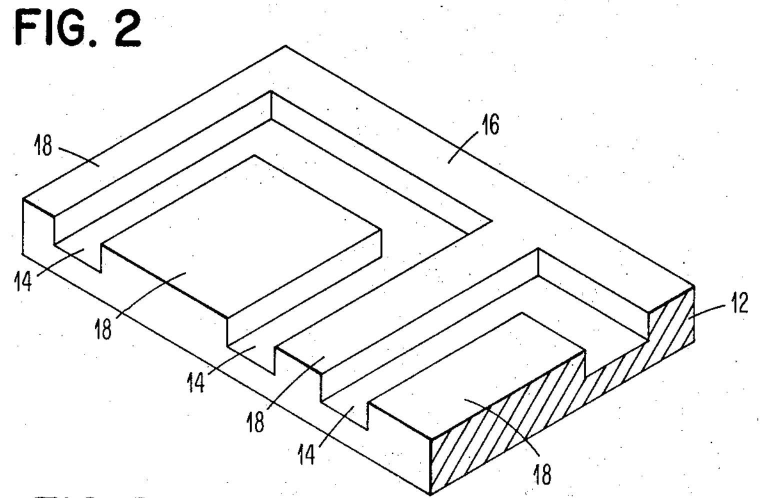
FIGS. 2–6 show the transducer of FIG. 1 manufactured in accordance with the process of this invention in successive stages of fabrication utilizing a foil member including grooves for receiving deposited conductive material.

Referring to FIG. 2, the first step in producing, for example, the multihead transducer of FIG. 1, involves preparation of a magnetically permeable foil material 12 which constitutes one portion of the magnetic transducer core. As illustrated, a series of generally U-shpaed non-serial grooves 14 have been produced in foil 12, for example, by photoetching techniques, although other means of removing material from the foil may be employed.

Where etching is utilized, well known procedures are followed. The surface of the foil is coated with a photoresist, exposed in the desired pattern so that the photoresist can be removed from the foil which is to be grooved, and the the foil is subjected to a suitable etchant such as iron chloride, mineral acid or other corrosive material. The depth of grooves 14 is not critical, so long as the groove is capable of receiving the subsequently deposited insulator and conductor in substantially nesting relationship. Following the etching procedure, the remaining photoresist is dissolved. The rectalinear shape and profile of grooves 14 is exaggerated for ease of illustration, as are also the relative dimensions of the assembly.

Figure 3:
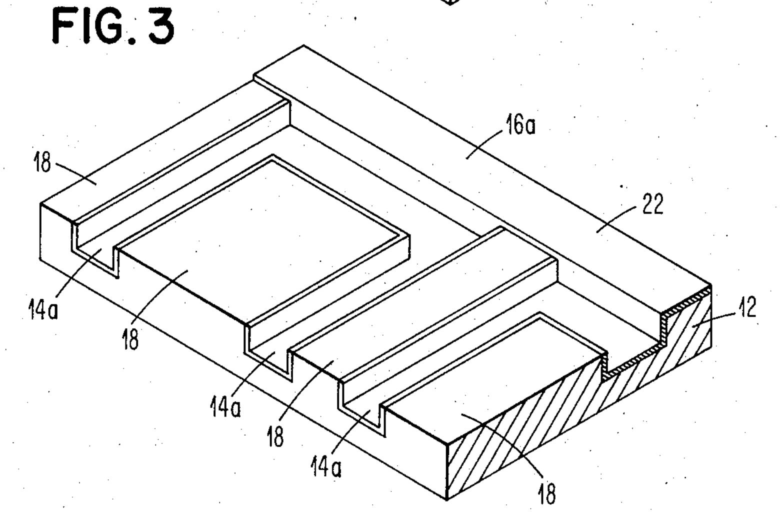

Now referring to FIG. 3, the grooved foil of FIG. 2 is insulated at selected portions. Another masking procedure is involved in this process so that the areas to receive the insulation, that is grooves 14 and front gap area 16, are left exposed. Back gap areas 18 are masked as they will later be utilized to make magnetic contact with a second foil member to complete the core. Following masking, a first insulation layer 22 is provided by sputtering, evaporation, or other techniques within grooves 14 and at gap 16. This first layer of insulation 22 serves at portions 14a to insulate grooves 14 from the later deposited conductors and also serves to form a portion 16a of the nonpermeable transducer gap at the pole tip. As an alternative to photoetching, insulating material 22 may be provided by deposition in the desired pattern by placing a metal mask of the desired configuration between the source of insulation and the grooved foil.

Figure 4:
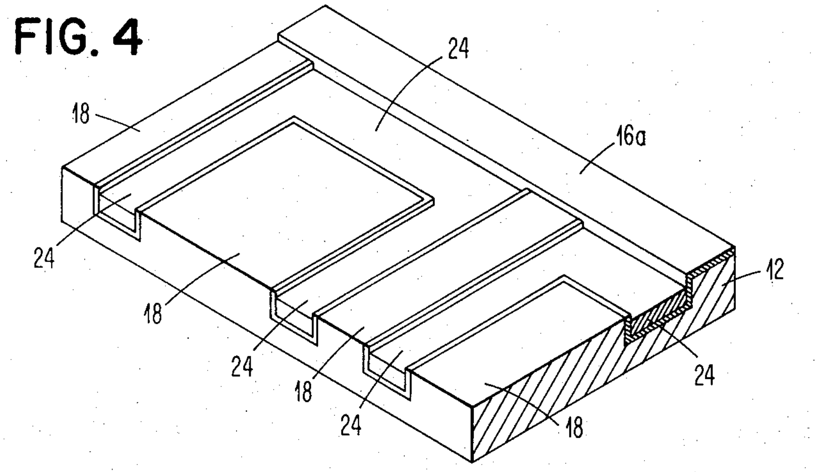

Referring now to FIG. 4, it is desired to deposit conductive material 24 within insulated grooves 14*a*. Therefore, for example, the areas not desired to be coated would be masked. In this case, both the insulated front gap area 16a and back gap area 18 would be masked. Following this masking procedure, conductive material 24, for example, in the form of evaporated copper would be deposited within the insulated nonserial grooves 14*a*. Again, either a metal mask or a photoresist type of masking technique could be utilized in depositing the conductor in the insulated grooves. Also, alternatively, the entire surface could be coated with conductive material with the conductive material then being removed from all but the groove area by photoetch techniques.

Figure 5:
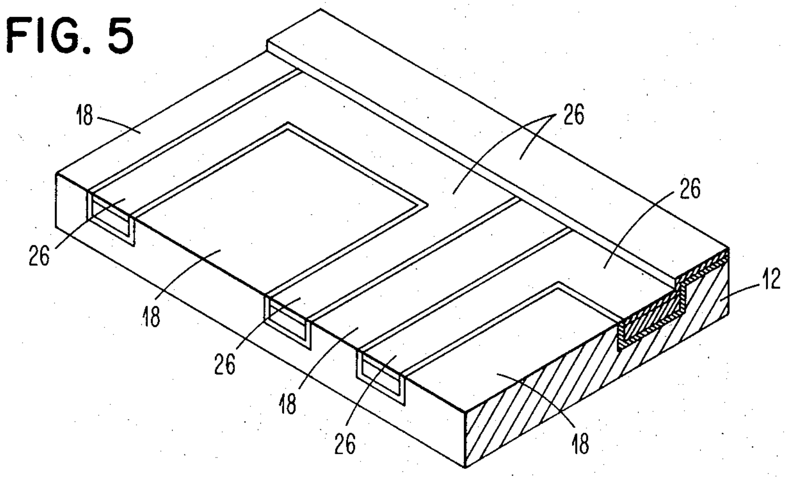

In FIG. 5, a second layer of insulation material 26 has been preferentially provided at the exposed portions of conductors 24 and, if desired, in the area of insulated front gap 16*a*, as shown. The conductors 24 are now completely isolated by insulation, and the thickness of the nonpermeable gap is a function of the thickness of the insulation material deposited at the gap. It is a matter of choice as to the thickness of the deposited insulation material at the front gap and as to the number of layers of insulation material utilized to thereby control the width of the gap. It is also within the scope of this invention to deposit additional layers of insulation or other magnetically nonpermeable material at the gap to control the gap thickness. It is further within the scope of this invention to avoid the deposition of any insulation at the gap during the proceeding steps and deposit a gap material of desired thickness and properties in a separate step. It is, however, clear that where the gap width is related to the thickness of one or more deposited insulating layers, it would be most convenient to provide the gap simultaneously with the insulation of the conductor. In any event, in this embodiment, conductive material is not present at the gap, and the gap material may be any suitable wear resistant nonmagnetic material such as glass, aluminum oxide, silicon carbide, or other wear resistant nonconductive material.

Figure 6:
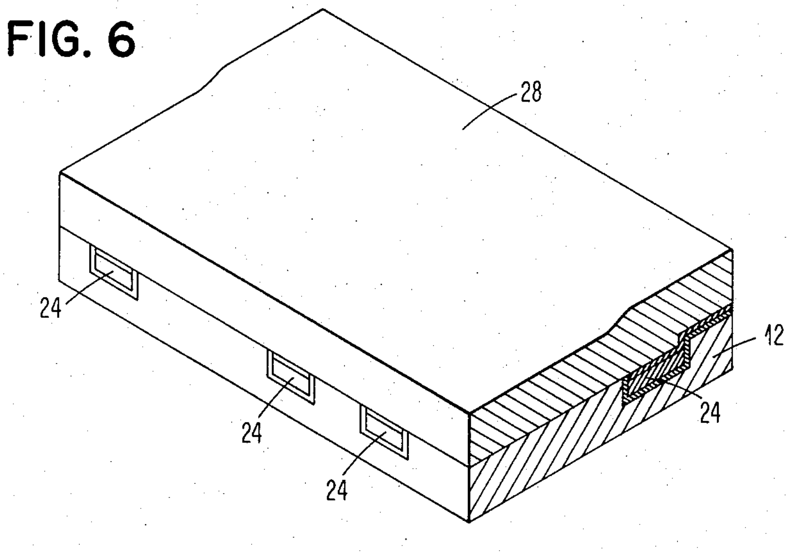

Referring now to FIG. 6, a second layer of foil 28 in substantially planar form is laid upon the first grooved and coated foil 12. Where a multitrack head is provided, a slot 32, see FIG. 1, is provided between each separate track, for example, by photoresist etching techniques. This maintains both magnetic and electrical independence from track to track which is a very important feature of this invention. As shown at FIG. 1, the head has been cut or ground to respond to specific size and flatness parameters.

As shown, overlayer foil 28 is bent due to the buildup of insulating material at the conductor and front gap in this embodiment. However, since the foil material is thin and malleable by nature, it easily conforms to the contours of this portion while still being capable of making magnetic contact with back gap 18 to complete the magnetic core. Furthermore, slight separation between overlayer foil 28 and the back gap 18 can be tolerated and still produce an operative head.

The degree of bending required of overlayer 28 is exaggerated in FIGS. 1 and 6 since, in a typical system, the entire gap would have a thickness of, for example, 100 microinches or less, while the foil would typically have a thickness of about one mil (1,000 microinches). It can therefore be understood that the amount of bending which would be required is small and could be accomplished quite easily without the danger of losing magnetic contact at the back gap. Of course, if it is desired to avoid bending of the foil, either the top or bottom layer of foil can be suitably recessed at the front gap or at other portions so that the thickness of the gap material can be accommodated within such recess without the requirement for bending either foil. Foil 28 is secured to foil 12, for example, by glueing, welding, or by pressure, without the use of mechanical bonding.

Figure 7:
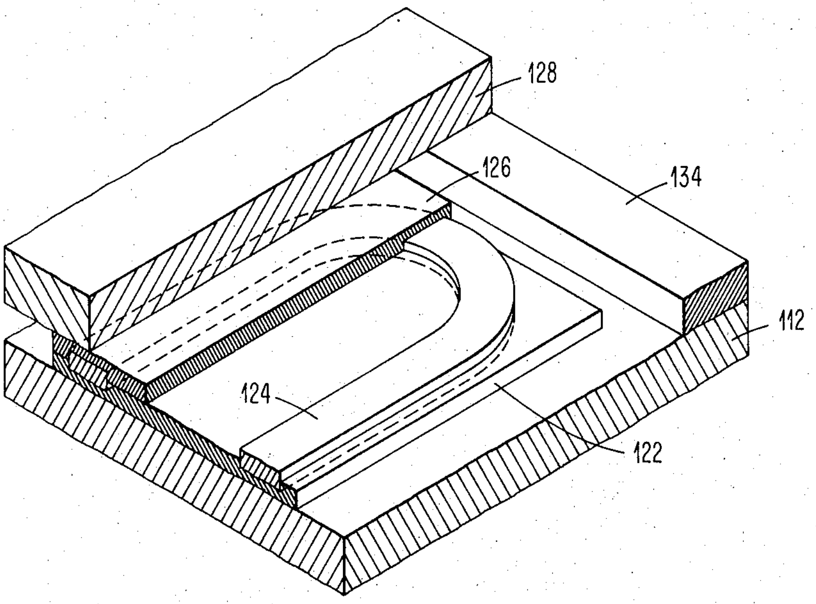
FIG. 7 is perspective, partial sectional, exaggerated view of another embodiment of this invention wherein both the foil members of the core are planar.

Referring now to FIG. 7, a modified form of the present invention is shown in a partial sectional and broken away exaggerated view. In this modification shown broken away and in partial section, neither the top nor bottom magnetic foil material is grooved. Both foil 112 and foil 128 are substantially planar. The two foil members make magnetic contact to complete the magnetic core circuit at a point in the lower left broken-away portion of the head, not shown. A nonconductive layer 122 is provided upon foil 112 with conductor 124 deposited on the nonconductor, and another nonconductive layer 126, shown in section, disposed to completely insulate conductor 124 from foil 128 also shown in section, but which has essentially the same dimensions as foil 112. In this embodiment, gap material 134 is discrete from insulators 122 and 126 and has been provided by a separate process step. In the preparation of this embodiment, it would be possible to utilize a nonpermeable shim material to provide gap 134. In the same manner, it would be possible to close the back gap area between foils 112 and 128, not shown, with a deposited magnetic film or a piece of magnetic foil.

Figure 8:
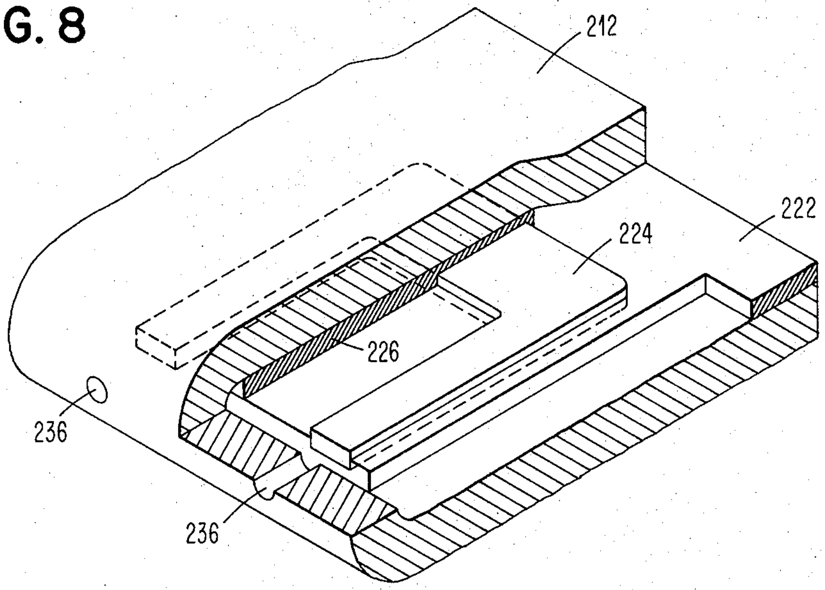
FIG. 8 is a perspective, partial sectional, exaggerated view of yet another embodiment of this invention wherein the core is formed of a single strip of magnetic foil bent in the shape of a U.

Referring now to FIG. 8, another modification of the present invention is shown in a partial, sectional, exaggerated perspective view. In this embodiment, a single piece of foil 212 is bent into the shape of a U to form a magnetic core. In this situation, the foil material may be grooved or not, as desired, in accordance with the teachings of the two previous embodiments. As shown in this example, a nonconductive layer 222 is provided to both insulate the magnetic winding and serve as the nonmagnetic gap. Conductor 224 is then deposited on the insulator and is then further insulated by material 226, shown in section, which in practice extends to cover the full surface of conductor 224. In this instance, insulating material 226 does not extend into the gap area so that the thickness of the gap is determined by the thickness of insulating layer 222 alone. Holes 236, for providing contact to conductor 224, are provided through foil 212 and the foil is then bent into the final exaggerated distorted U-shape, shown in FIG. 8. Electrical contact with the enclosed conductor can be provided by, for example, etching or drilling suitably located holes 236 at the bend of the foil and making insulated contact with the conductors through these holes.

Other modifications of this invention, which are not shown, but which would be within the skill of a worker in this art, include for example, a multiturn conductor approach using a spiral pattern of conductor in a foil head of the present invention while avoiding the presence of conductuve material at the gap. In yet another modification similar to the first embodiment, both foil members could be grooved to accommodate gap material, insulation, or conductors, as required. In still yet another modification, useful especially for single track heads, the deposited conductive material can extend substantially parallel to the gap, rather than being U-shaped. In this modification, external electrical contact with the head would be made at the sides rather than the back. Other conductor configurations are also possible.

In the practice of this invention, the magnetic foil materials will typically be in a thickness range of about 0.2 to 10 mils, with a thickness of no more than about 1 to 2 mils preferred to avoid eddy current losses. In a similar manner, the deposited conductive material will exhibit a thickness of about 0.1 mil to about 5 mils, with a preferred thickness of at least about 0.4 mil and the upper limit of thickness being essentially a function of the thickness of the magnetic foil and geometry of the head. The insulating material, when deposited or coated, will normally exhibit a thickness of about a minimum of 10 microinches, which is all that is necessary to provide adequate electrical insulation. The upper limit of insulation thickness is once again determined by the thickness of the foil, by the depth of the grooves, if any, and by the general geometry and configuration of the head. Where the insulation is provided by oxidation of the foil or conductor, it will range from about 100 to about 2,000 angstroms. In a practical sense, the width of the gap will be about 10 to about 200 microinches for use in conventional recording schemes. However, nothing within the scope of this invention would limit the gap from being as small as an oxidized metal layer, that is, about 100 angstroms.

Heads made in accordance with this invention could operate in a range of recording densities (in flux reversals per inch), relative recording velocities (in inches per second), and track width (in mils) up to 50,000 FRI, 2,000 ips, and about 1 mil, respectively.

It is thus seen, that in accordance with the present invention, high performance transducers have been provided which are comprised of discrete magnetic metallic foil portions including deposited conductors, which conductors are not present at the gap of the head. Further, the use of both planar and grooved foils is taught as are single and multiturn deposited conductive windings, which conductive windings are not present at the gap of the head. By the procedure taught, a head is formed which is not preferentially soft at the gap and which is therefore not subject to uneven or accelerated wear at the gap. Furthermore, the process of this invention allows the avoidance of the use of a nonfunctional substrate material in the preparation of a batch-fabricated head, and it further allows the avoidance of many deposition and photoetching steps which are normally required in the prior art batch-fabrication of a head utilizing thin film deposited magnetic material rather than magnetic foil. Where this technique is utilized to produce a multitrack head, since all of the tracks are cut from the same foil material there is no accumulation of track position tolerances. This makes it particularly easy to maintain a high degree of accuracy in the location of each track.

While the invention has been particularly shown and described with reference to preferred embodiments therof, it will be understood by those skilled in the art that various changes in form and details may be made therein without departing from the spirit and scope of the invention.

What is claimed is:

1. The method of forming a magnetic transducer element including a magnetically permeable core formed of magnetic foil and an exciting winding encompassed by said core, said core foil having pole tip areas defining a transducing gap including the steps of:

obtaining a first section of self-supporting magnetic foil and designating a portion as a core portion including a first pole tip area;

depositing conductive nonmagnetic material over a portion of said core portion spaced from the pole tip area to form an exciting winding; aand then positioning a second section of self-supporting magnetic foil having a second pole tip area to complete said core and encompass said deposited exciting winding, said first and second pole tip areas being in spaced-apart juxtaposition to define said transducing gap.

2. The method of claim 1 wherein said conductive material is deposited in electrically insulated relationship to said magnetic foil.

3. The method of claim 2 wherein electrically nonconducting material is provided on said magnetic foil prior to the deposition of said conductive material.

4. The method of claim 3 wherein electrically nonconducting material is provided between said conductive material and said completing magnetic foil.

5. The method of claim 4 wherein said nonconducting material is magnetically nonpermeable and extends into the pole tip area.

6. The method of claim 1 wherein magnetically nonpermeable material is provided at the transducing gap.

7. The method of claim 1 wherein the magnetic foil is grooved to accept the deposited conductive material.

8. The method of claim 7 wherein electrically nonconducting material is provided in said grooves prior to the deposition of said conductive material.

9. The method of claim 8 wherein electrically nonconducting material is provided between said conductive material and said completing magnetic foil.

10. The method of claim 9 wherein said electrically nonconducting material is magnetically nonpermeable and extends into the pole tip area.

11. The method of claim 10 wherein the magnetic foil has a thickness in the range of about 0.2 mil to about 10 mils, and the transducing gap is in the range of about 10 to 200 microinches wide.

12. The method of claim 7 wherein magnetically nonpermeable material is provided at the transducing gap.

* * * * *